(12) United States Patent
Stager et al.

(10) Patent No.: US 7,904,679 B2
(45) Date of Patent: Mar. 8, 2011

(54) METHOD AND APPARATUS FOR MANAGING BACKUP DATA

(75) Inventors: Roger Keith Stager, Livermore, CA (US); Donald Alvin Trimmer, Livermore, CA (US); Pawan Saxena, Pleasanton, CA (US); Craig Anthony Johnston, Livermore, CA (US); Yafen Peggy Chang, Fremont, CA (US); Rico Blaser, San Franciso, CA (US)

(73) Assignee: NetApp, Inc., Sunnyvale, CA (US)

( * ) Notice: Subject to any disclaimer, the term of this patent is extended or adjusted under 35 U.S.C. 154(b) by 252 days.

(21) Appl. No.: 11/051,794

(22) Filed: Feb. 4, 2005

(65) Prior Publication Data

US 2005/0193236 A1    Sep. 1, 2005

Related U.S. Application Data

(60) Provisional application No. 60/541,626, filed on Feb. 4, 2004, provisional application No. 60/542,011, filed on Feb. 5, 2004.

(51) Int. Cl.
*G06F 12/00* (2006.01)
(52) U.S. Cl. .............. 711/162; 711/163; 713/2; 713/158
(58) Field of Classification Search .................. 711/162, 711/163; 713/2, 158
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,163,148 A | 11/1992 | Walls | |
| 5,235,695 A | 8/1993 | Pence | |
| 5,269,022 A * | 12/1993 | Shinjo et al. ..................... 713/2 |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,555,371 A | 9/1996 | Duyanovich et al. | |
| 5,638,509 A | 6/1997 | Dunphy et al. | |
| 5,666,538 A | 9/1997 | DeNicola | |
| 5,673,382 A | 9/1997 | Cannon et al. | |
| 5,774,292 A | 6/1998 | Georgiou et al. | |

(Continued)

FOREIGN PATENT DOCUMENTS

CA    2 256 934 A1    6/2000

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner* — Yong Choe
(74) *Attorney, Agent, or Firm* — Perkins Coie LLP (57) ABSTRACT

A method and apparatus for managing backup data is disclosed. A data backup system defines a plurality of time windows for creating and maintaining backup data in accordance with a data backup policy. Each of the time windows is assigned a predetermined amount of storage space. When the data backup system creates backup data, the system determines whether a storage space assigned to a time window is large enough to accommodate new backup data. If the storage space is large enough, the new backup data is stored. However, if the storage space is not large enough, the system deletes the oldest backup data until enough storage space is obtained.

9 Claims, 3 Drawing Sheets

U.S. PATENT DOCUMENTS

| | | |
|---|---|---|
| 5,774,643 A | 6/1998 | Lubbers et al. |
| 5,774,715 A | 6/1998 | Madany et al. |
| 5,805,864 A | 9/1998 | Carlson et al. |
| 5,809,511 A | 9/1998 | Peake |
| 5,809,543 A | 9/1998 | Byers et al. |
| 5,835,953 A | 11/1998 | Ohran |
| 5,854,720 A | 12/1998 | Shrinkle et al. |
| 5,857,208 A | 1/1999 | Ofek |
| 5,864,346 A * | 1/1999 | Yokoi et al. .................... 345/501 |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 5,974,424 A | 10/1999 | Schmuck et al. |
| 6,021,408 A | 2/2000 | Ledain et al. |
| 6,021,491 A | 2/2000 | Renaud |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgls |
| 6,131,142 A | 10/2000 | Kamo et al. |
| 6,131,148 A | 10/2000 | West et al. |
| 6,134,660 A | 10/2000 | Boneh et al. |
| 6,163,856 A | 12/2000 | Dion et al. |
| 6,173,293 B1 | 1/2001 | Thekkath et al. |
| 6,173,359 B1 | 1/2001 | Carlson et al. |
| 6,195,730 B1 | 2/2001 | West |
| 6,225,709 B1 | 5/2001 | Nakajima |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,397,307 B2 | 5/2002 | Ohran |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur |
| 6,654,912 B1 | 11/2003 | Viswanathan et al. |
| 6,658,435 B1 | 12/2003 | McCall |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,796,489 B2 | 9/2004 | Slater et al. |
| 6,816,941 B1 | 11/2004 | Carlson et al. |
| 6,816,942 B2 | 11/2004 | Okada et al. |
| 6,834,324 B1 | 12/2004 | Wood |
| 6,839,843 B1 | 1/2005 | Bacha et al. |
| 6,850,964 B1 | 2/2005 | Ferguson et al. |
| 6,877,016 B1 | 4/2005 | Hart et al. |
| 6,898,600 B2 | 5/2005 | Fruchtman et al. |
| 6,915,397 B2 | 7/2005 | Lubbers et al. |
| 6,931,557 B2 | 8/2005 | Togawa |
| 6,950,263 B2 | 9/2005 | Suzuki et al. |
| 6,973,369 B2 | 12/2005 | Trimmer et al. |
| 6,973,534 B2 | 12/2005 | Dawson |
| 6,978,283 B1 | 12/2005 | Edwards et al. |
| 6,978,325 B2 | 12/2005 | Gibble |
| 7,007,043 B2 | 2/2006 | Farmer et al. |
| 7,020,779 B1 | 3/2006 | Sutherland |
| 7,032,126 B2 | 4/2006 | Zalewski et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,111,136 B2 | 9/2006 | Yamagami |
| 7,111,194 B1 | 9/2006 | Schoenthal et al. |
| 7,127,388 B2 | 10/2006 | Yates et al. |
| 7,127,577 B2 | 10/2006 | Koning et al. |
| 7,139,891 B1 | 11/2006 | Apvrille et al. |
| 7,152,077 B2 | 12/2006 | Veitch et al. |
| 7,152,078 B2 | 12/2006 | Yamagami |
| 7,155,465 B2 | 12/2006 | Lee et al. |
| 7,155,586 B1 | 12/2006 | Wagner et al. |
| 7,200,726 B1 | 4/2007 | Gole et al. |
| 7,203,726 B2 | 4/2007 | Hasegawa et al. |
| 7,251,713 B1 | 7/2007 | Zhang |
| 7,302,057 B2 | 11/2007 | Rotholtz et al. |
| 7,346,623 B2 | 3/2008 | Prahlad et al. |
| 7,558,839 B1 | 7/2009 | McGovern |
| 7,774,610 B2 | 8/2010 | McGovern et al. |
| 2001/0047447 A1 | 11/2001 | Katsuda |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0091670 A1 | 7/2002 | Hitz et al. |
| 2002/0095557 A1 | 7/2002 | Constable et al. |
| 2002/0144057 A1 | 10/2002 | Li et al. |
| 2002/0163760 A1 | 11/2002 | Lindsay et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0005313 A1 | 1/2003 | Gammel et al. |
| 2003/0025800 A1 | 2/2003 | Hunter et al. |
| 2003/0037211 A1 | 2/2003 | Winokur |
| 2003/0046260 A1 | 3/2003 | Satyanarayanan et al. |
| 2003/0120476 A1 | 6/2003 | Yates et al. |
| 2003/0120676 A1 | 6/2003 | Holavanahalli et al. |
| 2003/0126136 A1 | 7/2003 | Omoigui |
| 2003/0126388 A1 | 7/2003 | Yamagami |
| 2003/0135672 A1 | 7/2003 | Yip et al. |
| 2003/0149700 A1 | 8/2003 | Bolt |
| 2003/0158766 A1 | 8/2003 | Mital et al. |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 * | 12/2003 | Kavuri .......................... 707/204 |
| 2004/0015731 A1 | 1/2004 | Chu et al. |
| 2004/0098244 A1 | 5/2004 | Dailey et al. |
| 2004/0103147 A1 | 5/2004 | Flesher et al. |
| 2004/0158766 A1 | 8/2004 | Liccione et al. |
| 2004/0167903 A1 | 8/2004 | Margolus et al. |
| 2004/0168034 A1 * | 8/2004 | Homma et al. ................ 711/162 |
| 2004/0168057 A1 * | 8/2004 | Margolus et al. ............. 713/158 |
| 2004/0181388 A1 | 9/2004 | Yip et al. |
| 2004/0181707 A1 | 9/2004 | Fujibayashi |
| 2004/0186858 A1 | 9/2004 | McGovern et al. |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |

| | | | |
|---|---|---|---|
| 2005/0076070 A1* | 4/2005 | Mikami | 707/204 |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0097260 A1 | 5/2005 | McGovern et al. | |
| 2005/0108302 A1 | 5/2005 | Rand et al. | |
| 2005/0144407 A1 | 6/2005 | Colgrove et al. | |
| 2005/0182910 A1 | 8/2005 | Stager et al. | |
| 2005/0240813 A1 | 10/2005 | Okada et al. | |
| 2006/0010177 A1 | 1/2006 | Kodama | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |
| 2006/0259160 A1 | 11/2006 | Hood et al. | |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 | 4/2006 |
| EP | 1 671 231 | 6/2006 |
| EP | 1 671231 | 6/2006 |
| WO | WO99/03098 | 1/1999 |
| WO | WO99/06912 | 2/1999 |
| WO | WO-0118633 A1 | 3/2001 |
| WO | WO-03067438 A2 | 8/2003 |
| WO | WO-2004084010 A2 | 9/2004 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts Into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Creates 'Next Critical Step' in Disaster Recovery for Patrick Air Force Base, Securitus VTL Sets the Pace", Apr. 20, 2004.
"Alacritus to Demonstrate Chronospan CDP with the Brocade Fabric Application Platform at Storage Networking World", Apr. 1, 2004.
"Alacritus to Demo Chronospan Continuous Data Protection with the Cisco MDS 9000", Apr. 1, 2004.
"Alacritus and Network Appliance Deliver Advanced Virtual Tape Library, Solution Shortens Backup Windows, Accelerates Data Recovery, and Simplifies Backup Management", Dec. 7, 2004.
"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

Joan Daemen et al., "AES Proposal: Rijndael", The Rijndael Block Cipher, Document Version 2, Mar. 1999, 45 pages.

Joan Daemen et al., "Note on Naming", Rijndael, Sep. 4, 2003, 2 pages.

Decru, "Decru Datafort E-Series Storage Security Appliances, Transparant Data Security for Network Attached Storage (NAS)", 2004, 2 pages.

Simon L. Garfinkel et al., "Rememberance of Data Passed: A Study of Disk Sanitization Practices", IEEE Security and Privacy, vol. 1, No. 1, 2003 19 pages.

Hatfield. "Write Read Verify Feature Set". May 14, 2004.

Chris Lueth, "WORM Storage on Magnetic Disks Using SnapLock Compliance™ and SnapLock Enterprise™", Network Applicance, Inc., Sep. 2003, sections 1-5 13 pages.

"Network Appliance WORM Storage Solution: SEC 17 a-4(f) Compliance Assessment", Network Appliance; Inc., Jul. 10, 2003. pp. 1-20.

Novell NetWare Server Disks And Storage Devices Administration Guide. Netware 5.1, Jan. 2000, pp. 1-60.

Co-pending U.S. Appl. No. 10/933,005, filed Sep. 1, 2004.

Co-pending U.S. Appl. No. 11/051,862, filed Feb. 4, 2005.

Co-pending U.S. Appl. No. 12/040,276, filed Feb. 29, 2008.

Advisory Action Mailed Jan. 15, 2010 in Co-pending U.S. Appl. No. 11/051,862, filed Feb. 4, 2005.

Final Office Action Mailed Aug. 7, 2008 in Co-pending U.S. Appl. No. 10/933,005, filed Sep. 1, 2004.

Final Office Action Mailed Aug. 10, 2007 in Co-pending U.S. Appl. No. 10/933,005, filed Sep. 1, 2004.

Final Office Action Mailed Oct. 29, 2009 in Copending U.S. Appl. No. 11/051,862, filed Feb. 4, 2005.

Final Office Action Mailed Dec. 11, 2008 in Co-pending U.S. Appl. No. 11/051,862, filed Feb. 4, 2005.

Final Office Action Mailed Sep. 20, 2007 in Co-pending U.S. Appl. No. 11/051,862, filed Feb. 4, 2005.

Non-Final Office Action Mailed Dec. 30, 2008 in Co-pending U.S. Appl. No. 10/933,005, filed Sep. 1, 2004.

Non-Final Office Action Mailed Jan. 7, 2008 in Co-pending U.S. Appl. No. 10/933,005 filed Sep. 1, 2004.

Non-Final Office Action Mailed Feb. 8, 2007 in Co-pending U.S. Appl. No. 10/933,005, filed Sep. 1, 2004.

Non-Final Office Action Mailed Apr. 14, 2009 in Co-pending U.S. Appl. No. 11/051,862, filed Feb. 4, 2005.

Non-Final Office Action Mailed Apr. 16, 2008 in Co-pending U.S. Appl. No. 11/051,862, filed Feb. 4, 2005.

Non-Final Office Action Mailed Mar. 22, 2007 in Co-pending U.S. Appl. No. 11/051,862, filed Feb. 4, 2005.

Non-Final Office Action Mailed Apr. 6, 2010 in Co-Pending U.S. Appl. No. 10/933,005, filed Sep. 1, 2004.

Final Office Action Mailed Jul. 23, 2010 in Co-Pending U.S. Appl. No. 10/933,005, filed Sep. 1, 2004.

Microsoft Windows XP, released 2001.

Centered Systems, "Second Copy 7", (1991-2007).

* cited by examiner

METHOD AND APPARATUS FOR MANAGING BACKUP DATA

CROSS REFERENCE TO RELATED APPLICATIONS

This application claims priority from U.S. provisional application Nos. 60/541,626 filed Feb. 4, 2004 and 60/542,011 filed Feb. 5, 2004, which are incorporated by reference as if fully set forth herein.

FIELD OF INVENTION

The present invention relates to data backup. More particularly, the present invention is a method and apparatus for managing backup data.

BACKGROUND

Many schemes have been developed to protect data from accidental loss or damage. One of them is hardware redundancy schemes, such as redundant arrays of independent disks (RAID).

Unfortunately, hardware redundancy schemes are ineffective in dealing with logical data loss or corruption. For example, a file deletion or virus infection is often automatically replicated to all of the redundant hardware components and can neither be prevented nor recovered from by such technologies.

To overcome this problem, backup technologies have been developed to retain multiple versions of a production system over time. This has allowed administrators to restore previous versions of data and to recover from data corruption.

One type of data protection system involves making point in time (PIT) copies of data. A first type of PIT copy is a hardware-based PIT copy, which is a mirror of a primary volume onto a secondary volume. The main drawbacks of the hardware-based PIT copy are that the data ages quickly and that each copy takes up as much disk space as the primary volume. A software-based PIT, so called a "snapshot," is a "picture" of a volume at the block level or a file system at the operating system level.

Backup data is generated in accordance with a data backup policy. Typically, the data backup policy sets an expiration time of each backup. For example, a system may retain all writes to the system for two days to provide any-point-in-time protection, and retain hourly snapshots for two weeks, daily snapshots for two months, and monthly snapshots for one year. Each snapshot has its own expiration time. Typically, the expiration time is determined by a main system clock. The system automatically deletes backup data upon expiration of the timer of each backup in accordance with the main system clock.

If a system operator accidentally or maliciously advances the main system clock, the system would automatically delete snapshots or a metadata timer of which is set before the accidentally or maliciously advanced time. In that situation, the system may or may not recover the deleted data.

SUMMARY

The present invention is a method and apparatus for managing backup data. A data backup system defines a plurality of time windows for creating and maintaining backup data in accordance with a data backup policy. Each of the time windows is assigned a predetermined amount of storage space. When the data backup system creates a backup data, the system determines whether a storage space assigned to a time window is large enough to accommodate the new backup data. If the storage space is large enough, the new backup data is stored, but if the storage space is not large enough, the system deletes the oldest backup data until enough storage space is obtained.

The system may assign a predetermined number of data backups to each of the time windows. Newly created backup data is stored if the number of backups does not exceed the assigned number. The system may also use an internal clock, independent from a main clock, in managing backup data.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

The present invention will be described with reference to the drawing figures wherein like numerals represent like elements throughout.

Figure 1A:
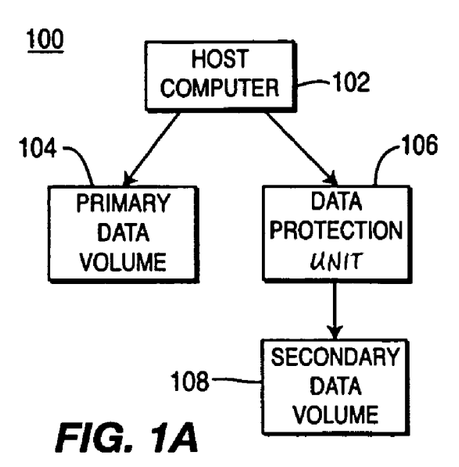
FIGS. 1A-1C are block diagrams of data backup system in accordance with the present invention.

FIG. 1A shows an example of a data backup system 100 that can be implemented in accordance with the present invention. The system 100 comprises a host computer 102, a primary data volume 104 (the primary data volume may also be referred to as a protected volume), a data protection unit 106, and a secondary data volume 108. The host computer 102 is coupled to the primary data volume 104 and to the data protection unit 106. The data protection unit 106 manages the secondary data volume 108, and generates and maintains backup data for data stored in the primary data volume 104. The configuration of the system 100 minimizes the lag time by writing directly to the primary data volume 104 and permits the data protection unit 106 to focus exclusively on managing the secondary data volume 108.

It should be noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the type of data storage device at each location. The primary volume 104 is typically an expensive, fast, and highly available storage subsystem, whereas the secondary volume 108 is typically a cost-effective, high capacity, and comparatively slow (for example, ATA/SATA disks) storage subsystem.

Figure 1B:
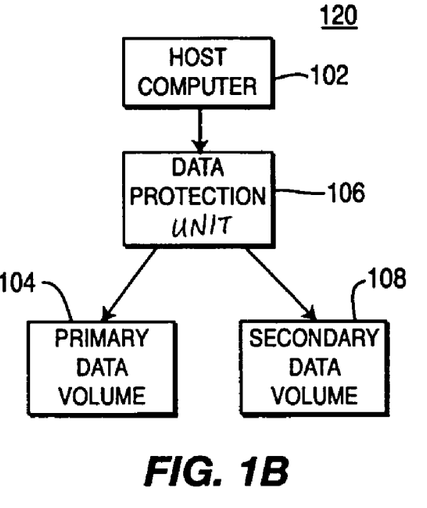

FIG. 1B shows an alternative example of a system 120 that can be implemented in accordance with the present invention. The host computer 102 is directly connected to the data protection unit 106, which manages both the primary data volume 104 and the secondary data volume 108. The system 120 may be slower than the system 100 described with reference to FIG. 1A, because the data protection unit 106 must manage both the primary data volume 104 and the secondary data volume 108. Although slower operation results in a higher latency for writes to the primary volume 104 in the system 120 and lowers the available bandwidth for use, such a configuration as shown in FIG. 1B may be acceptable in certain applications.

Figure 1C:
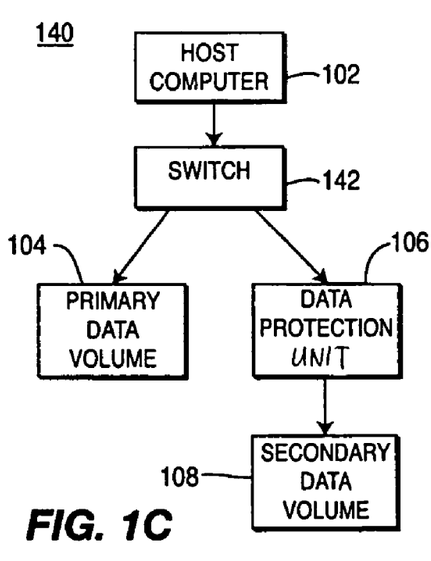

FIG. 1C shows another example of a system 140 that can be implemented in accordance with the present invention. The host computer 102 is connected to an intelligent switch 142. The switch 142 is connected to the primary data volume 104 and the data protection unit 106 which, in turn, manages the secondary data volume 108. The switch 142 includes the ability to host applications and contains some of the functionality of the data protection unit 106 in hardware, to assist in reducing system latency and improve bandwidth.

It should be noted that the configurations of the system in FIGS. 1A-1C are provided as an example. And any other configuration may be implemented, and the data protection unit 106 operates in the same manner regardless of the particular configuration of the system 100, 120, 140. The primary difference between these examples is the manner and place in which a copy of each write is obtained. To those skilled in the art, it is evident that other embodiments, such as the cooperation between a switch platform and an external server, are also feasible. Accordingly, although two data volumes are shown, a single data volume may be used. Additionally, although two data volumes may be used, they made configured such that they are stored on a single storage device.

Figure 2:
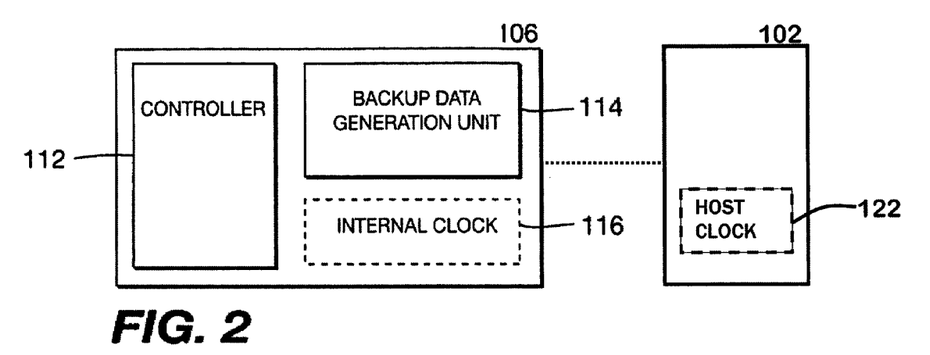
FIG. 2 is a block diagram of a data protection unit in accordance with the present invention.

FIG. 2 is a block diagram of the data protection unit 106 in accordance with the present invention. Backup data is generated, stored and deleted in accordance with a data backup policy. The data protection unit 106 controls generating, storing and deleting of backup data. The data protection unit 106 comprises a controller 112, and a backup data generation unit 114. Optionally, the data protection unit 106 may further comprise an internal clock 116, which will be explained in detail hereinafter.

The controller 112 provides overall control of generating, storing, and deleting backup data. The backup data generation unit 114 generates backup data, such as snapshots, under the control of the controller 112 as desired under the backup policy. The backup data is stored in a storage unit, such as a secondary volume 108. Each backup data has its own expiration time and the controller 112 deletes backup data when that expiration time has expired.

Figure 3:
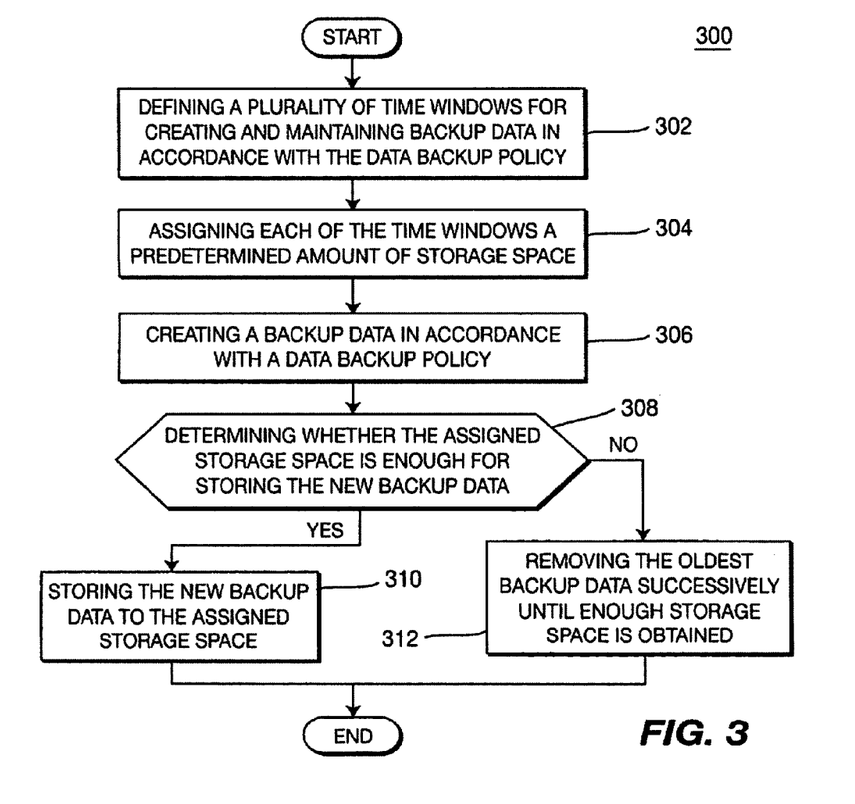
FIGS. 3-5 are flow diagrams of processes for managing backup data in accordance with the present invention.

A process for managing backup data will be explained with reference to FIGS. 3-5. FIG. 3 is a flow diagram of a process 300 for managing backup data in accordance with a first embodiment of the present invention. The controller 112 defines a plurality of time windows for creating and maintaining backup data in accordance with a data backup policy (step 302). The time windows may be an hour, a day, a week, a month, a year, or any other period that fits the requirements of the system or the data administrator. For example, the controller 112 may retain all writes generated by the host computer to provide any-point-in-time (APIT) protection, and may retain hourly snapshots, daily snapshots, weekly snapshots, and monthly snapshots.

The controller 112 assigns each of the time windows a predetermined amount of storage space (step 304). For example, the controller 112 may assign 100 GB for APIT window, 100 GB for hourly snapshots, 100 GB for daily snapshots, 100 GB for weekly snapshots, and 100 GB for monthly snapshots.

The backup data generation unit 114 creates backup data under the control of the controller 112 (step 306). For example, if the data backup policy is set to retain every write operation for APIT protection, the backup data generation unit 114 duplicates every write operation in the storage space assigned to the APIT window. In storing the writes, the controller 112 determines whether the assigned storage space is large enough to store the new backup data (step 308). If there is enough assigned storage space remaining to accommodate the new backup data, the new backup data is stored (step 310). However, if the assigned storage space is not large enough, the oldest stored backup data is deleted successively in the assigned storage space until enough storage space in the assigned storage space is obtained to accommodate the newly created backup data (step 312).

As previously described with reference to the prior art, each write retained for APIT protection is deleted after a specific expiration time has passed, for example 24 hours, and the passage of time is calculated by the main system clock. In contrast, in accordance with the present invention, the writes are not deleted depending upon the passage of time, but rather depending upon space availability. This is done without regard to the status of the main system clock. In a time period wherein few writes are committed to the primary storage, the APIT window may retain a much longer period of data; whereas in a time period of very high write activity, a shorter period of data may be retained. The duration of retention is a function of the assigned storage space and frequency of write operations. With this scheme, backup data is protected from accidental or malicious adjustment of the main system clock.

Figure 4:
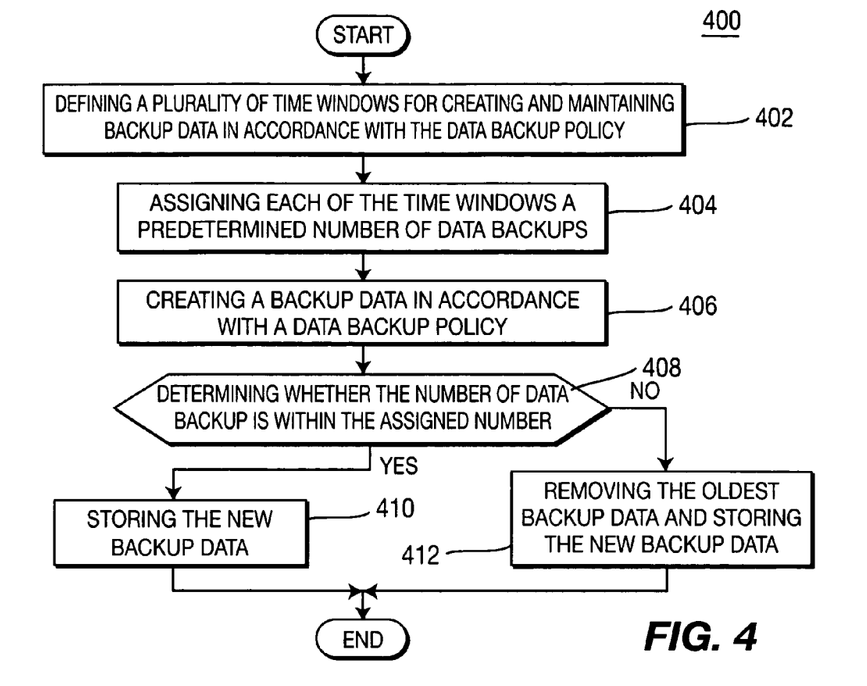

FIG. 4 is a flow diagram of a process 400 for managing backup data in accordance with a second embodiment of the present invention. The process 400 is similar to process 300. In process 400, however, each time window is assigned a predetermined number of backups as explained in more detail below.

The controller 112 defines a plurality of time windows for creating and maintaining backup data in accordance with the data backup policy (step 402). The controller 112 assigns each of the time windows a predetermined number of backups (step 404). For example, the controller 112 may assign 100 backups for APIT window, 50 for hourly snapshots, 10 for daily snapshots, 10 for weekly snapshots, and 20 for monthly snapshots.

The backup data generation unit 114 creates backup data under the control of the controller 112 (step 406). For example, if the data backup policy is set to retain every write operation for APIT protection, the backup data generation unit 114 duplicates every write operation in a storage assigned to the APIT window. In storing the writes, the controller 112 determines whether the assigned number has been exceeded before storing the new backup data (step 408). If the assigned number has not been exceeded, the new backup data is stored (step 410). However, if the assigned number has been exceeded, the oldest backup data may be first deleted and the new backup data is stored (step 412). Alternatively, if the assigned number has been exceeded, generation of new backup data may be stopped, or interleaving backup data may be deleted before storing the new backup data.

As previously described with reference to the prior art, each write retained for APIT protection would typically be deleted after a certain expiration time has passed, and the passage of time is calculated in accordance with the main system clock. In contrast, in accordance with the present invention, the writes are not deleted depending upon the passage of time, but rather depending upon the available number of backups. This is done without regard to the main system clock. Therefore, in a time period wherein few writes are committed to the primary storage, the APIT window may retain a longer period of data; whereas in a time period of very high write activity, a shorter period of data may be retained. The duration of retention is a function of the assigned number and frequency of write operations. With this scheme, backup data is protected from accidental or malicious adjustment of the main system clock.

Figure 5:
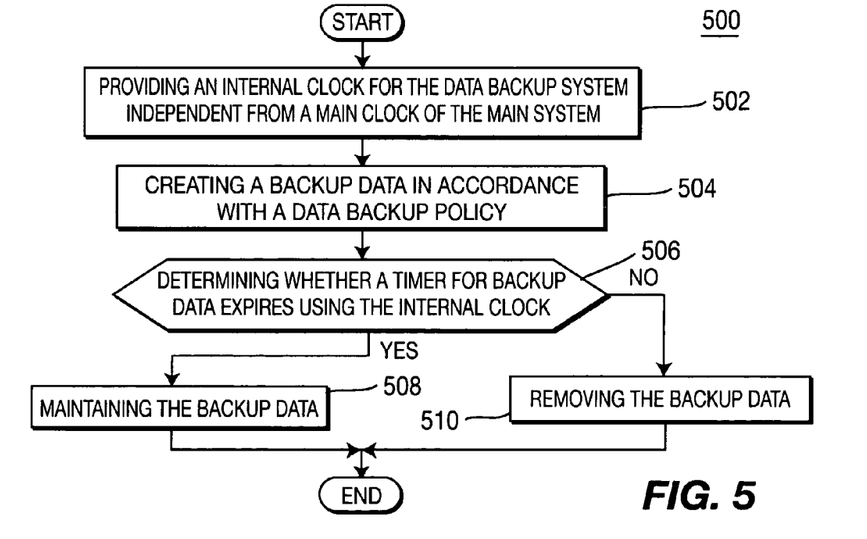

FIG. 5 is a flow diagram of a process 500 for managing backup data in accordance with a third embodiment of the present invention. In the third embodiment, an internal clock 116, (separate from the main clock 122 in the host computer 102), is provided in the data protection unit 106 (step 502). The internal clock 116 is a permanent clock. The internal clock 116 is set when the data protection unit 106 is initiated. As the main clock advances, the internal clock 116 advances as well. However, when the main clock is adjusted, the data protection unit 106 preferably maintains an offset between the main clock and the internal clock 116 instead of adjusting the internal clock 116.

A backup data is created in accordance with the data backup policy (step 504). The controller 112 determines whether the expiration time for a particular backup has expired in accordance with the internal clock 116 (step 506). Expired backup data is deleted (step 510) and unexpired backup data is maintained (step 508).

The data protection unit 106 deletes expired backup data in accordance with the internal clock 116, rather than the main clock. With this scheme, the data protection unit 106 may maintain the lifespan of data backups independent from an adjustment to the main clock.

Alternatively, the system may record the interval that the system has been up and adjust the internal clock by the last recorded interval. The interval is recorded on a persistent media. The internal clock may be referred to as an "uptime clock" since the internal clock in this alternative counts only the time that the system is running. When the system is recovered from shut down, the main clock and the internal clock should be reset. The internal clock is adjusted with the last recorded interval during which the system is up. With this scheme, the internal clock may not jump back or forward more than one recorded interval. As a consequence, the backup data is expired based only on the time that the system is running not counting the time that the system is down.

The foregoing embodiments may be combined with each other. For example, the data backup policy may specify that at least five (5) hourly snapshots should be taken at any given time as far as the hourly snapshots do not take more than 100 GB of storage space. The system may then take as many snapshots until the 100 GB are used up. The system may further set an expiration time for each backup data in accordance with an internal clock. Thereafter, the system may delete expired backup data even before the 100 GB limit is used up.

While specific embodiments of the present invention have been shown and described, many modifications and variations could be made by one skilled in the art without departing from the scope of the invention. The above description serves to illustrate and not limit the particular invention in any way.

What is claimed is:

1. A method for protecting backup data stored in a data backup system, the backup data being created in accordance with a data backup policy, the method comprising:
   defining a plurality of time windows for creating and maintaining backup data in accordance with the data backup policy;
   assigning each of the time windows a predetermined amount of storage space;
   creating backup data in accordance with the data backup policy;
   determining whether a storage space assigned to a particular time window is large enough for new backup data;
   storing the new backup data at the particular time window if the storage space is large enough to store the new backup data, and if the storage space is not large enough to store the new backup data at the particular time window, then deleting the oldest backup data until enough storage space for the new backup data in the assigned storage space at the particular time window is obtained; and
   deleting the new backup data subsequent to retaining the new backup data in the data backup system for a specific time duration, wherein the specific time duration is indicated by the data backup policy and is calculated using an internal clock that is independent from a main system clock of the data backup system, wherein the internal clock is located in a data protection unit of the data backup system and the main system clock is located in a host computer of the data backup system, wherein the internal clock calculates the specific time duration by counting time during which the data backup system is operative, and wherein the internal clock is not functional and does not count time during which the data backup system is not operative.

2. The method of claim 1 further comprising the step of assigning each of the time windows a predetermined number of data backups, whereby new backup data is created and maintained as long as the assigned number of data backups for the time window has not been reached.

3. An apparatus for backing up data comprising:
   a backup data generation unit for creating backup data in accordance with a data backup policy;
   a data storage for storing the backup data; and
   a controller for defining a plurality of time windows for creating and maintaining backup data in accordance with the data backup policy, and for assigning each of the time windows a predetermined amount of storage space, whereby new backup data created during a particular time window is stored in a storage space assigned to the time window if the assigned storage space is large enough to store the new backup data, and if the assigned storage space is not large enough to store the new backup data at the particular time window, then deleting the oldest backup data until enough storage space for the new backup data in the assigned storage space at the particular time window is obtained, and then deleting the new backup data subsequent to retaining the new backup data in the data backup system for a specific time duration, wherein the specific time duration is indicated by the data backup policy and is calculated using an internal clock that is independent from a main system clock of the data backup system, wherein the internal clock is located in a data protection unit of the data backup system and the main system clock is located in a host computer of the data backup system, wherein the internal clock calculates the specific time duration by counting time during which the data backup system is operative, and wherein the internal clock is not functional and does not count any time during which the data backup system is not operative.

4. The apparatus of claim 3 wherein the controller further assigns each of the time windows a predetermined number of data backups, whereby new backup data is stored if the number of data backups in the time window is within the assigned number.

5. The apparatus of claim 4 wherein if the number of data backups is not within the assigned number, then the controller deletes the oldest backup data before storing the new backup data.

6. The apparatus of claim 4 wherein if the number of data backups is not within the assigned number, then stopping generation of new backup data.

7. The apparatus of claim 4 wherein if the number of data backups is not within the assigned number, then deleting interleaving backup data before storing the new backup data.

8. The apparatus of claim 3 wherein the backup data generation unit generates a snapshot of the data.

9. The apparatus of claim 8 wherein the snapshot is stored in a secondary storage.

* * * * *